(12) United States Patent
Martinez et al.

(10) Patent No.: US 6,429,775 B1
(45) Date of Patent: *Aug. 6, 2002

(54) APPARATUS FOR TRANSPORTING RADIO FREQUENCY POWER TO ENERGIZE RADIO FREQUENCY IDENTIFICATION TRANSPONDERS

(75) Inventors: Rene D. Martinez, Ossining; Harley Kent Heinrich, Brewster, both of NY (US); Paul J. Sousa, deceased, late of Middleton (PT), by Anddie Chan, executor; Li-Cheng R. Zai, Los Gatos, CA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/658,953

(22) Filed: Sep. 11, 2000

Related U.S. Application Data

(63) Continuation-in-part of application No. 09/556,240, filed on Apr. 24, 2000, now abandoned, which is a continuation-in-part of application No. 09/425,860, filed on Oct. 23, 1999, now abandoned, said application No. 09/556,240, and a continuation-in-part of application No. 09/211,584, filed on Dec. 14, 1998, now abandoned, which is a continuation of application No. 08/626,820, filed on Apr. 3, 1996, now Pat. No. 5,850,181.

(60) Provisional application No. 60/105,496, filed on Oct. 23, 1998.

(51) Int. Cl.[7] .............................................. G08B 13/14
(52) U.S. Cl. .................................. 340/572.1; 340/693.1
(58) Field of Search ........................... 340/572.1, 693.1, 340/10.1, 10.3, 10.34, 825.69, 825.72; 342/42, 44, 51; 375/202

(56) References Cited

U.S. PATENT DOCUMENTS

| | | | | |
|---|---|---|---|---|
| 4,566,009 A | * | 1/1986 | Hanni et al. | 342/45 |
| 5,109,217 A | * | 4/1992 | Siikarla et al. | 340/572.1 |
| 5,349,332 A | * | 9/1994 | Ferguson et al. | 340/572.1 |
| 5,438,332 A | * | 8/1995 | Adam et al. | 342/45 |
| 5,495,229 A | * | 2/1996 | Balch et al. | 340/572.1 X |
| 5,850,181 A | * | 12/1998 | Heinrich et al. | 340/572.1 |

OTHER PUBLICATIONS

Zuta, "A new PLL with fast settling time and low phase noise", Microwave Journal, vol. 41, No. 6, pp. 94–108, Jun. 1998.*

* cited by examiner

Primary Examiner—Thomas Mullen
(74) Attorney, Agent, or Firm—Rodney T. Hodgson

(57) ABSTRACT

An apparatus, method, and system are provided for sending radio frequency (RF) power to RF transponders (RFID tags), wherein the frequency sent to the tags is changed very rapidly.

48 Claims, 4 Drawing Sheets

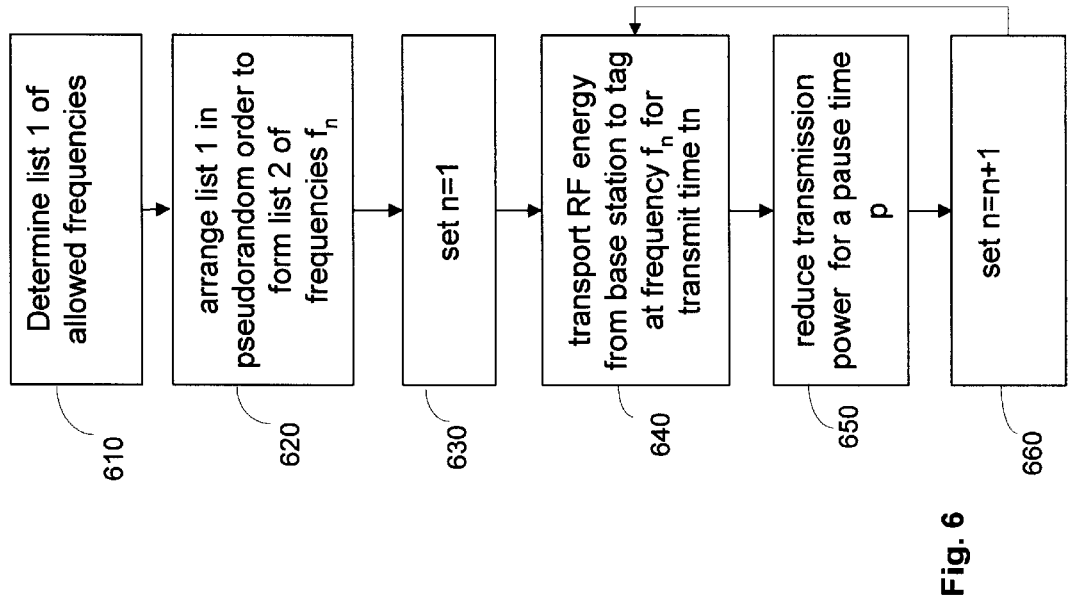
Fig. 6
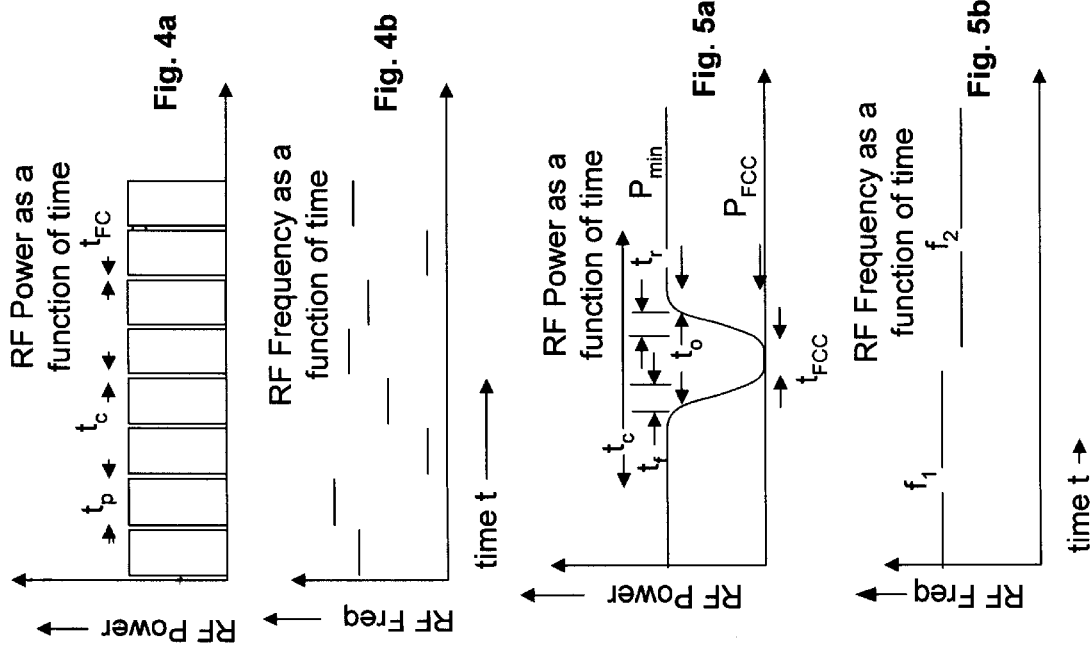

APPARATUS FOR TRANSPORTING RADIO FREQUENCY POWER TO ENERGIZE RADIO FREQUENCY IDENTIFICATION TRANSPONDERS

CROSS REFERENCE TO RELATED APPLICATIONS

This application is a continuation-in-part (CIP) of U.S. application Ser. No. 09/556,240 filed Apr. 24, 2000, now abandoned, which is a CIP of U.S. application Ser. No. 09/425,860 filed Oct. 23, 1999, now abandoned, which claims priority pursuant to 35 U.S.C. 119(e) to U.S. Provisional Application No. 60/105,496 filed Oct. 23, 1998. Said U.S. application Ser. No. 09/556,240 filed Apr. 24, 2000 is also a CIP of U.S. application Ser. No. 09/211,584 filed Dec. 14, 1998, now abandoned, which is in turn a continuation of application Ser. No. 08/626,820 filed Apr. 3, 1996, (now U.S. Pat. No. 5,850,181, issued Dec. 15, 1998). All of the above applications being incorporated herein by reference in their entirety including incorporated material.

PATENTS AND APPLICATIONS

Related U.S. Patents assigned to the assignee of the present invention include: U.S. Pat. Nos. 5,521,601; 5,528,222; 5,538,803; 5,550,547; 5,552,778; 5,554,974; 5,563,583; 5,565,847; 5,606,323; 5,635,693; 5,673,037; 5,680,106; 5,682,143; 5,729,201; 5,729,697; 5,736,929; 5,739,754; 5,767,789; 5,777,561; 5,786,626; 5,812,065; and 5,821,859. U.S. Patent applications assigned to the assignee of the present invention include: application Ser. No. 08/626,820, filed: Apr. 3, 1996, (now U.S. Pat. No. 5,850,181 issued Dec. 15, 1998) entitled "Method of Transporting RF Power to Energize Radio Frequency Transponders", by Heinrich, Zai, et al.; application Ser. No. 08/694,606 filed Aug. 9, 1996 (now U.S. Pat. No. 5,942,987 issued Aug. 24, 1999); Radio frequency identification system with write broadcast capability entitled RFID System with Write Broadcast Capability by Cesar et al.; application Ser. No. 08/681,741 filed Jul. 29, 1996 (now U.S. Pat. No. 5,874,902 issued Feb. 23, 1999) entitled RFID Transponder with Electronic Circuitry Enabling and Disabling Capability, by Heinrich, Goldman et al.; and application Ser. No. 09/153,617 filed Sep. 15, 1998, (now U.S. Pat. No. 6,122,329 issued Sep. 19, 2000) entitled RFID Interrogator Signal Processing System for Reading Moving Transponder, by Zai et al. The above identified U.S. Patents and U.S. Patent applications are hereby incorporated by reference.

BACKGROUND OF THE INVENTION

1. Field of the Invention

The field of the invention is the field of Radio Frequency (RF) transmission of power to supply energy to remote electronic equipment, especially equipment for the location, identification, and measurement of objects, items, animals, or people associated with RF transponders.

2. Description of the Prior Art

RF Transponders (RF Tags) can be used in a multiplicity of ways for locating and identifying accompanying objects and transmitting information about the state of the object. It has been known since the early 60's in U.S. Pat. No. 3,098,971 by R. M. Richardson, that electronic components of transponders could be powered by radio frequency (RF) electromagnetic (EM) waves sent by a "base station" and received by a tag antenna on the transponder. The RF EM field induces an alternating current in the transponder antenna which can be rectified by an RF diode on the transponder, and the rectified current can be used for a power supply for the electronic components of the transponder. The transponder antenna loading is changed by something that was to be measured, for example a microphone resistance in the cited patent. The oscillating current induced in the transponder antenna from the incoming RF energy would thus be changed, and the change in the oscillating current led to a change in the RF power radiated from the transponder antenna. This change in the radiated power from the transponder antenna could be picked up by the base station antenna and thus the microphone would in effect broadcast power without itself having a self contained power supply. The "rebroadcast" of the incoming RF energy is conventionally called "back scattering", even though the transponder broadcasts the energy in a pattern determined solely by the transponder antenna. Since this type of transponder carries no power supply of its own, it is called a "passive" transponder to distinguish it from a transponder containing a battery or other energy supply, conventionally called an active transponder.

Active transponders with batteries or other independent energy storage and supply means such as fuel cells, solar cells, radioactive energy sources etc. can carry enough energy to energize logic, memory, and tag antenna control circuits. However, the usual problems with life and expense limit the usefulness of such transponders.

In the 70's, suggestions to use backscatter transponders with memories were made. In this way, the transponder could not only be used to measure some characteristic, for example the temperature of an animal in U.S. Pat. No. 4,075,632 to Baldwin et. al., but could also identify the animal.

The continuing march of semiconductor technology to smaller, faster, and less power hungry has allowed enormous increases of function and enormous drop of cost of such transponders. Presently available research and development technology will also allow new function and different products in communications technology. However, the new functions allowed and desired consume more and more power, even though the individual components consume less power.

It is thus of increasing importance to be able to power the transponders adequately and increase the range which at which they can be used. One method of powering the transponders suggested is to send information back and forth to the transponder using normal RF techniques and to transport power by some means other than the RF power at the communications frequency. However, such means require use of possibly two tag antennas or more complicated electronics.

Sending a swept frequency to a transponder was suggested in U.S. Pat. No. 3,774,205. The transponder would have elements resonant at different frequencies connected to the tag antenna, so that when the frequency swept over one of the resonances, the tag antenna response would change, and the backscattered signal could be picked up and the resonance pattern detected.

Prior art systems can interrogate the tags if more than one tag is in the field. U.S. Pat. No. 5,214,410, hereby incorporated by reference, teaches a method for a base station to communicate with a plurality of tags.

Sending at least two frequencies from at least two antennas to avoid the "dead spots" caused by reflection of the RF was proposed in EPO 598 624 A1, by Marsh et al. The two frequencies would be transmitted simultaneously, so that a transponder in the "dead spot" of one frequency would never be without power and lose its memory of the preceding transaction.

The prior art teaches a method to interrogate a plurality of tags in the field of the base station. The tags are energized, and send a response signal at random times. If the base station can read a tag unimpeded by signals from other tags, the base station interrupts the interrogation signal, and the tag which is sending and has been identified, shuts down. The process continues until all tags in the field have been identified. If the number of possible tags in the field is large, this process can take a very long time. The average time between the random responses of the tags must be set very long so that there is a reasonable probability that a tag can communicate in a time window free of interference from the other tags.

In order that the prior art methods of communicating with a multiplicity of tags can be carried out, it is important that the tags continue to receive power for the tag electronics during the entire communication period. If the power reception is interrupted for a length of time which exceeds the energy storage time of the tag power supply, the tag "loses" the memory that it was turned off from communication, and will restart trying to communicate with the base station, and interfere with the orderly communication between the base station and the multiplicity of tags.

The amount of power that can be broadcast in each RF band is severely limited by law and regulation to avoid interference between two users of the electromagnetic spectrum. For some particular RF bands, there are two limits on the power radiated. One limit is a limit on the continuously radiated power in a particular bandwidth, and another limit is a limit on peak power. The amount of power that can be pulsed in a particular frequency band for a short time is much higher than that which can be broadcast continuously.

Federal Communications Commission Regulation 15.247 and 15.249 of Apr. 25, 1989 (47 C.F.R. 15.247 and 15.249) regulates the communications transmissions on bands 902–928 MHZ, 2400–2483.5 MHZ, and 5725–5850 MHZ. In this section, intentional communications transmitters are allowed to communicate to a receiver by frequently changing frequencies on both the transmitter and the receiver in synchronism or by "spreading out" the power over a broader bandwidth. The receiver is, however, required to change the reception frequency in synchronism with the transmitter.

U.S. Pat. No. 5,408,202 by Shirazi, et al., issued Apr. 18, 1995, and U.S. Pat. No. 6,107,843 by de Gouy, et al., issued Aug. 22, 2000, give details on fractional phase lock loops which can control oscillators with a speed necessary for the purposes of the present invention.

An article by Marc Zuta, in Microwave Journal of June, 1998 (page 94) gives details on a representative feedback circuit which can control an oscillator with a speed necessary for the present invention.

OBJECTS OF THE INVENTION

It is an object of the invention to provide an improved system, apparatus, and method to transport RF power to an RF transponder.

It is further an object of the invention to transport RF power to an RF transponder by means of switching frequencies from a first frequency to a second frequency in a very short time.

It is further an object of the invention to transport RF power to an RF transponder by providing circuits which allow switching frequencies from a first frequency to a second frequency in a very short time.

SUMMARY OF THE INVENTION

The present invention is an apparatus, a system, and a method to use a "hopping frequency" signal to power remote electronic equipment such as RF transponders. In essence, an RF transmitter broadcasts a series of high power pulses, where the frequency of each pulse is chosen in order from a pseudo randomly ordered list of allowed frequencies. The transponders are able to receive power at all the frequencies sent. The energy received is stored in an energy store on the tag. The time between pulses is preferably shorter than the time taken for the tag electronics to The time between pulses is preferably shorter than the time taken for the tag electronics to The transponder could be passive or active, and the power transported to an active The transponder could be passive or active, and the power transported to an active when the transponder is in the range of the base station transmitter, and thus save the battery energy which would not be needed to "listen for" the communications when the transponder was not in the range of the transmitter of the base station.

BRIEF DESCRIPTION OF THE DRAWINGS

FIG. 4a is the power and FIG. 4b is the frequency transmitted as a function of time in one of the preferred methods of the invention.

FIG. 5a is the power and FIG. 5b is the frequency transmitted as a function of time in one of the preferred methods of the invention.

FIG. 6 is a block diagram of an alternative preferred method of the invention.

DETAILED DESCRIPTION OF THE INVENTION

Figure 1:
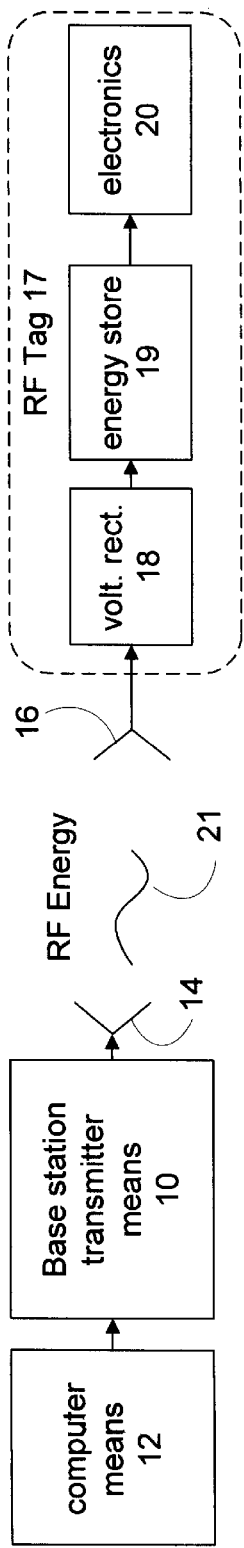
FIG. 1 is a block diagram of a system for transporting RF power to an RF transponder.

A method of transporting power to a remote antenna connected to electronic circuitry for transport power to an RF Identification and Location transponder (RFID Transponder) having logic circuits, memory circuits, and antenna impedance control circuits. The memory circuits can be written and read remotely. Examples of preferred RFID transponders and base stations are given in U.S. Pat. No. 4,656,463 issued on Apr. 7, 1987 by Anders et. al., which patent is hereby FIG. 1 is a block diagram outlining the apparatus needed for implementing the method of the invention. A base station transmitter 10 is controlled by computer means 12 to send various frequencies and amplitudes of RF energy to base station antenna 14. Antenna 14 radiates an RF electromagnetic wave 15 which causes a current to oscillate in tag antenna 16 of the transponder (tag) 17 receiving the RF power. A voltage rectifying power circuit 18 connected to tag antenna 16 provides power to energy store 19 while the RF energy 15 is being broadcast. Energy store 19 can be any means known in the art for storing energy, but is typically a capacitor on a semiconductor chip. Energy store 19 supplies energy to the electronic circuitry 20. Electronic circuitry 20 may contain communication circuitry for receiving communications sent from the base station in the form of modulations of the RF energy and/or frequency. Electronic circuitry 20 may contain a read only memory and/or a read write memory and/or a means for changing the loading on the tag antenna in order to change the back scattering characteristics of the tag antenna for purposes of communication with the base station. Computer 12 may also be used to receive, analyze, store, and communicate data sent by the base station transmitter 10 to the transponder. Computer 12 may also receive and communicate data sent by the tag to a receiver (not shown). The tag requires both power to operate, and a minimum voltage to run the semiconductor devices in the tag electronics 20. It is important that the voltage supplied by the tag energy store 19 not drop below a threshold level during the tag communication protocol. If the RF energy 15 transmitted from the base station antenna 14 is stopped, the energy stored in the tag energy store 19 is depleted in a characteristic time t. which depends on the capacity of the tag energy store 19, the amount of energy actually stored in the tag energy store 19, (since the tag may be in a range from the base station where the energy store is not fully charged) and the power demands of circuitry 20. The capacity of the tag energy store can be made quite large, but for low cost tags, it should be in the range of the energy storage capacitance of capacitors formed by normal electronics technology used for semiconductor chips. More capacitance takes more area on the chip, and is more costly. It is necessary that the RF transmission of energy not be interrupted for a time to greater than the critical time $t_c$. It is preferable that the frequency be changed and the RF transmission of energy be interrupted for a time $t_{off}$ less than 100 microseconds. It is more preferable that the transmission be interrupted for a time $t_{off}$ less than 10 microseconds, even more preferable that the transmission be interrupted for a time $t_{off}$ less than 1 microsecond, and most preferable that the transmission be interrupted for a time $t_{off}$ less than 500 nanoseconds.

It is preferable that the frequency be changed in a time $t_0$ less than 100 microseconds. It is more preferable that the transmission be interrupted for a time $t_0$ less than 10 microseconds, even more preferable that the transmission be interrupted for a time $t_0$ less than 1 microsecond, and most preferable that the transmission be interrupted for a time $t_0$ less than 500 nanoseconds. (See discussion of FIG. 5 below).

Figure 2:
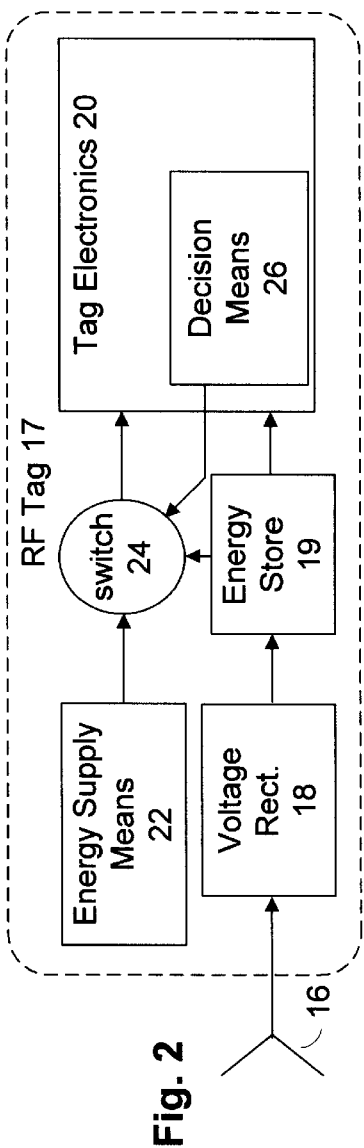
FIG. 2 is a block diagram of an RF transponder having an independent power means and a switching means for switching on the independent power means when the switching means is energized by the transported RF power or, alternatively, when a part of the tag electronics is energized by the transported RF power.

FIG. 2 shows a block diagram of the apparatus for implementing a preferred method of the invention where the tag 17 is an active tag which contains an energy supply means 22 such as a battery and a switch means 24 for connecting the energy supply means 22 to the tag electronics 20 when the switch means 24 is energized by the voltage rectifying power circuit 18 and the energy store 19. Electronic circuitry decision means 26 which is part of the tag electronics 20 may alternatively be energized by the voltage rectifying power circuit 18, and decision means 26 may decide on the basis of the power received by the energy supply means 22 to fully energize electronic circuitry 20 by connecting energy supply means 22 with the tag electronics through switch means 24.

In one preferred method of the invention, the frequency sent out from the base station must be changed over time. However, if the frequency is changed slowly from a first frequency $f_1$ to a second frequency $f_2$, the sent out frequency passes through a number of other frequencies in between $f_1$ and $f_2$. If the frequency is changed very rapidly, a large bandwidth of frequencies is generated, with the bandwidth center sweeping from $f_1$ to $f_2$ over time. Both of these results would possibly result in interference with other users of the spectrum, which is prohibited by FCC regulations. A preferred method is to turn off the transmitter or reduce the power of the transmitter while the frequency change is taking place.

However, the tag relies on the sent out power to keep critical functions, such as its "short term memory", active while the tag and the base station are in communication with each other. Other critical functions of the tag which would be affected by loss of power are the "clock signal" which would be lost and a "tag state" which would be changed. Loss of the "short term memory" would seriously affect communication protocols for the tag, IE. the multiple tag communication protocols referred to above. It is critical that the power be turned off for a very short time.

Figure 3:
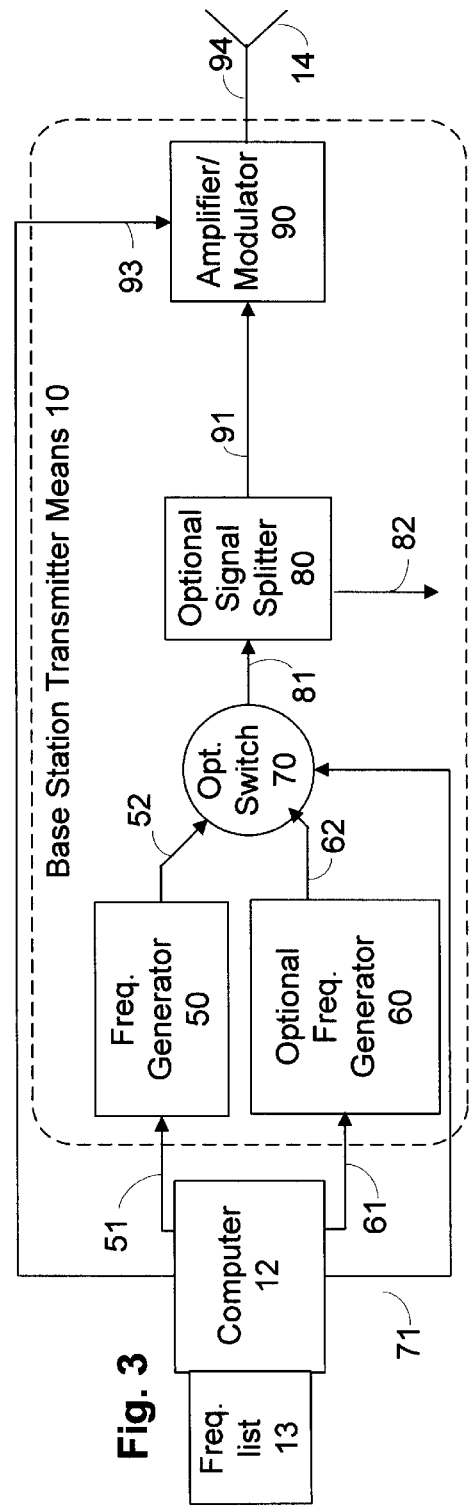
FIG. 3 is block diagram of an alternative preferred apparatus of the invention.

A base station transmitter 10 for transporting RF power to RF transponders shown in FIG. 3 enables sending out two different frequency pulses separated by a very short time, specifically less than $t_c$. In one embodiment, a single RF generator 50 is used to sequentially generate two different RF frequencies $f_1$ and $f_2$ under control of the computer 12 over line 51. RF generator 50 can switch frequencies in a time $t_0$ less than the time $t_c$ which is taken for the tag energy store 19 to be drained to a level where a critical tag function is impaired. When RF generator 50 is switching frequency, amplifier/modulator unit 90 is optionally switched off under control of computer 12 over line 93, RF generators 50 (and 60) and RF amplifier/modulators are well known.

In another preferred embodiment, one or more additional optional RF generators 60 are included in the base station transmitter means 10. This is an innovative apparatus for providing a fast means for changing the RF frequency of signals sent by a base station to RF tags. Optional RF switch 70 is controlled by computer 12 over line 71 to switch either RF generator 50 or optional RF generator 60 to the rest of the base station transmitter 10.

For a time $t_p$, RF generator 50 is connected via lines 81 and 52 through switch 70 to an optional signal splitter 80 which divides the RF signal coming from the switch 70. A small part of the RF energy from RF generator 50 is tapped off in splitter 80 to be sent to an RF receiver (not shown) via line 82. (The RF receiver uses the frequency as a comparison to detect the backscattered radiation from the tags.) Most of the RF energy from RF generator 50 is sent to amplifier modulator module 90 via line 91. Amplifier/Modulator module 90 is controlled via line 93 by computer 12, and sends amplified and optionally modulated RF energy over line 94 to antenna 14.

When the base station transmitter 10 is transmitting power to the tag 17, and shown here for simplicity as not sending a modulated communication signal, the RF power and the RF frequency as a function of time are shown in FIG. 4a and FIG. 4b respectively. The RF power is on for a pulse time $t_p$ of 300 to 400 milliseconds, for an RF frequency approximately 2.4 Ghz. Then, the power may be reduced to a very small amount, which is preferably zero. During part of the time that the computer 12 instructs the amplifier/modulator 90 to cease amplification, a power that is lower than an FCC power limit $P_{FCC}$, defined as the maximum power that can be sent out of frequency channel being used, is sent out from antenna 14 during a time $t_{FCC}$, The computer instructs switch 70 to switch from frequency generator 50 to frequency generator 60 during the time $t_{FCC}$, Well known RF switches such as switch 70 can easily switch from one source to the other in less than a microsecond. During the time $t_p$ which RF generator 50 has been sending RF power at frequency f, to the amplifier, frequency generator 60 has had ample time to change frequencies to frequency $f_2$ from its previous frequency.

After the computer commands switch 70 to change the amplifier connection from RF generator 50 to RF generator 60, a frequency is chosen from a frequency list 13 stored in the computer memory or other memory location to be the next frequency to be transmitted, and instructs RF generator 50 to set itself to the next frequency required after frequency f2 so that the sent out frequency can again be changed during the next power off time. The computer then instructs modulator 90 to amplify once again and send the next pulse of RF power to antenna 14. After the time $t_p$, the RF generator 50 has settled to the new frequency and the switch 70 switches back to generator 50 during the at the appropriate time.

The transmitted RF power and frequency during a changeover are shown in FIG. 5a and 5b respectively. The rise time $t_r$ and fall time $t_f$ of the power during the switching are very important. When the RF power is switched off and on, side bands of frequencies $f_1$ and $f_2$ respectively will be generated and sent to the antenna 14. The allowed frequency broadening depends on the frequency bands used. If the frequency broadening is too great, the sidebands may cause interference, which is not allowed. The frequency broadening becomes greater as $t_r$ and $t_f$ are reduced. There is thus a limit below which $t_r$ and $t_f$ should not be reduced. Thus, the off time $t_{off}$ during which the RF power sent out is reduced below power $P_{min}$, where $P_{min}$ is the power which can sustain the energy in the tag energy store 19 above the level needed by the tag electronics 20, must be greater than $t_{FCC}$ plus the time taken to reduce power from $P_{min}$ to $P_{FCC}$ plus the time taken to raise the power again from $P_{FCC}$ to $P_{min}$. For example, in the 2.4 Ghz band, the off time $t_{off}$ should be longer than approximately 700 nanoseconds to allow for both the rise and fall times shown in FIG. 5a. More preferably, the off time is longer than 10 microseconds. The time taken for the frequency to change between a first frequency and a second frequency $t_0$ is shown on FIG. 5b.

This means that the off time $t_{off}$ should be shorter than a first limit time because the tag will lose memory or other tag function, and longer than a second limit time, so that the frequency sent may change without introducing interfering levels of RF power outside the allowed channels.

The frequency shifts of the transmitter can be random or can be programmed to a particular pattern such as a ramp or stair step pattern which used sufficient frequencies in the bandwidth that the limits on average power in a particular frequency would not exceed regulations. A pseudo random pattern is the most preferred pattern.

A preferred method of the invention is given by the flow chart 600 in FIG. 6, and comprises the steps of:

610 Determining a first list of a large plurality of allowed frequencies.

620 Optionally arranging the first list of the large plurality of allowed frequencies as a pseudo randomly ordered second list of a large plurality of allowed frequencies f.sub.n.

630 Initializing the process by setting n=1.

640 Transporting RF power for a time $t_p$ from a base station to a radio frequency transponder at a frequency f.sub.n chosen from the random ordered second list of large plurality of allowed frequencies.

650 Ceasing to transmit power for a time $t_{off}$.

660 Setting n=n+1 and returning to step 640.

Figure 7:
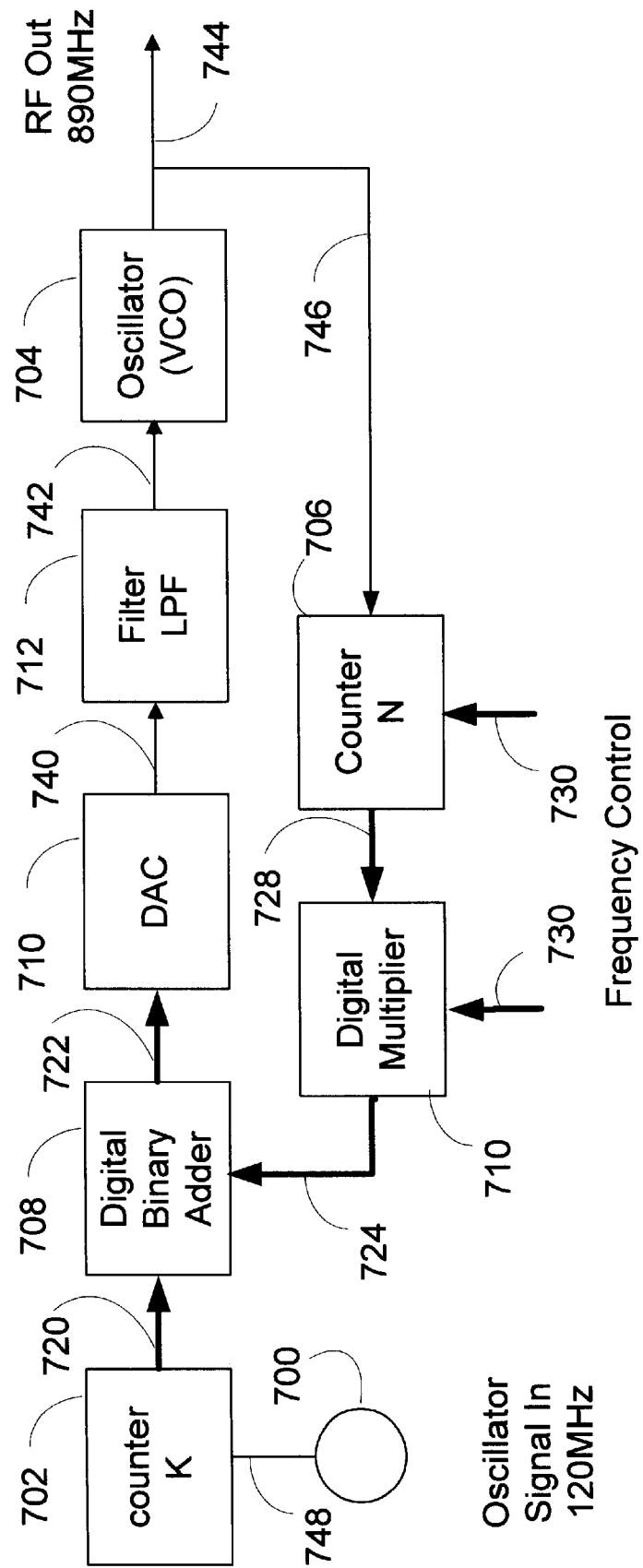
FIG. 7 is a block diagram of an alternative preferred method of the invention.

FIG. 7 shows a block diagram for a frequency generator 50 of FIG. 3. FIG. 7 shows a phase lock loop circuit described in an article by Marc Zuta, in Microwave Journal of June, 1998 (page 94). For purposes of illustration, definite frequencies will be used in the following descriptions, although one of skill in the art will realize that many other frequencies and frequency ranges could be used as well.

A normal crystal oscillator or other means provides a frequency in the range of 10 MHz to the base station. A reference signal in the range of 120 MHz is generated in reference frequency generator 700 and sent on line 748 to reference signal counter 702 which counts the peaks of the reference signal modulo 4000. Counter 702 sends the value J of the counter 702 to a digital binary adder 708 over bus 720. The phase of counter 702 is given by Reference signal counter phase=J/4000×360 degrees.

The output of the frequency generator 50 is given from the voltage controlled oscillator (VCO) 704, and part of the output signal is fed back through a VCO counter 706. Counter 706 gives a signal on bus 728 to a digital multipliers 710. The phase of the VCO counter 706 is given by VCO counter phase=L/27000×360 degrees where the VCO counter counts modulo (say) 27000. The phase error between counter 702 and counter 706 controls the VCO. Digital multiplier 710 multiplies the signal from counter 706 by a negative number which is about 4000/27000 so that the signals from digital multiplier 710 and counter 702 have the same units (degrees) and can be compared. Signals are sent from the counter 702 and multiplier 710 on busses 724 and 720 to the digital binary adder 708, and the output of the adder 708 is sent over bus 722 to a digital to analogue converter 710, which converts the digital sum into an analogue voltage and sends the voltage over a single line 740 to optional low pass filter 712 which is used to control the VCO 704. The circuit shown in FIG. 7 is different from prior art phase lock loops used in base stations for transmitting signals to RF tags in that the prior art compares only the most significant bit of the reference and VCO signals. The most significant bit frequency is 120MHz/4000=30 KHz, so the prior art feedback loop limits the time in which the VCO can change frequency to the order of many times 1/30 KHz. With the circuit shown in FIG. 7, the lower order bits on bus lines 720 and 724 can be used to control the VCO, with times related to 1/120 MHz. The VCO may be controlled in FIG. 7 by control bus lines 728 and 730.

Figure 8:
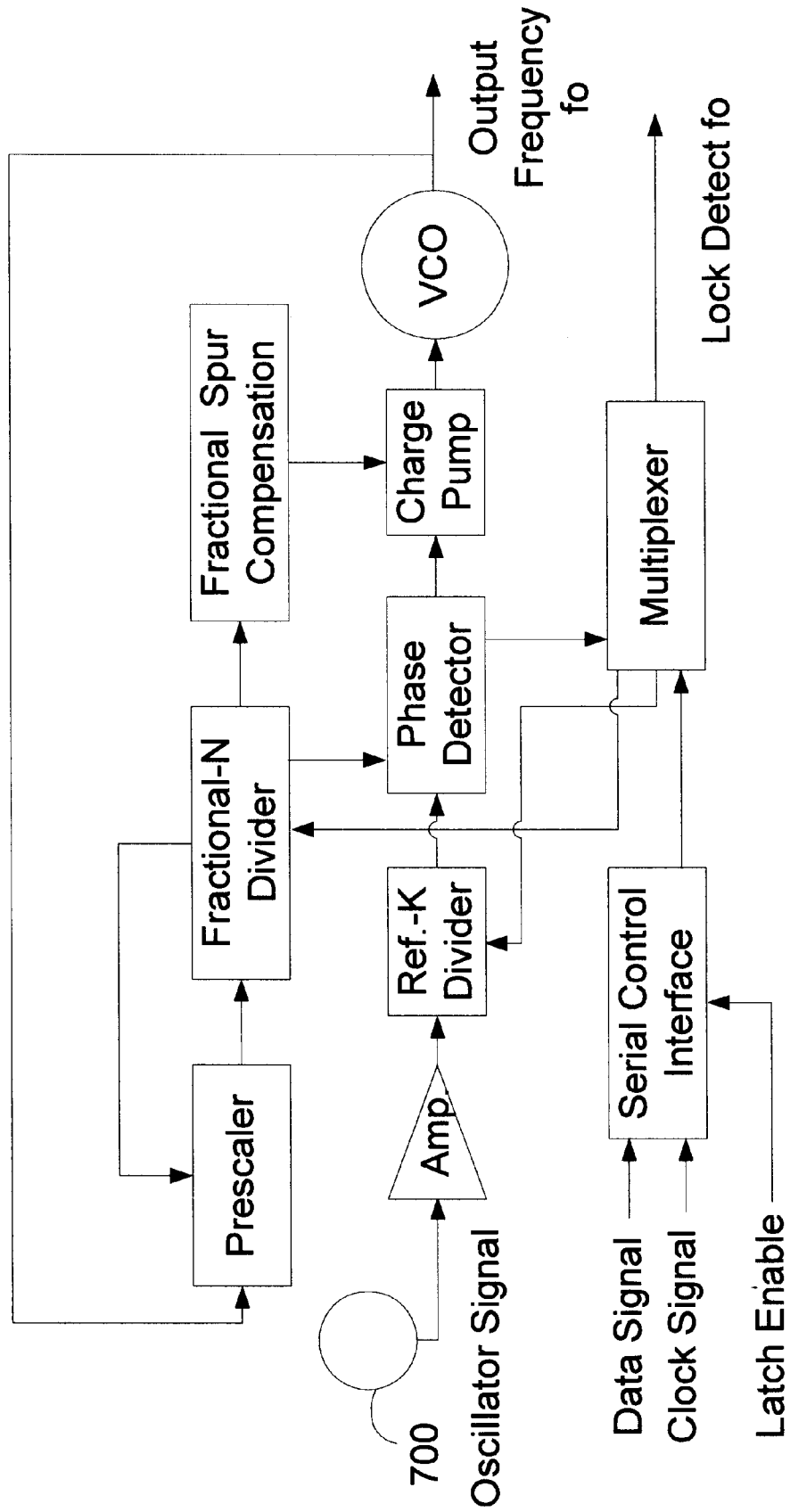
FIG. 8 is a block diagram of an alternative preferred method of the invention.

FIG. 8 shows a fractional phase lock loop frequency control. An example of a commercial embodiment of such a loop is provided by Peregrine Semiconductor Corp PE3282A. The fractional N divider may divide in part of a cycle by N, and in part of a cycle by N+1, which allows a rapid phase control of the VCO in the order of 1/10 MHz.

Given this disclosure, alternative equivalent embodiments would become apparent to one skilled in the arts that are within the contemplation of the inventors. For example, different times $t_p$ for different frequencies, and different times to switch frequency $t_0$, as long as the times taken to switch frequency are less than that time which would affect critical electronic components of the tag, are foreseen.

We claim:

1. A method of transporting energy from a base station to a radio frequency (RF) transponder (RF tag), comprising:

a) transporting for a first time RF electromagnetic wave energy from the base station to the RF tag, the RF energy having a first frequency $f_1$; then b) transporting for a second time RF electromagnetic wave energy from the base station to the RF tag, the RF energy having a second frequency $f_2$, wherein the time $t_0$ taken to change frequency from the first to the second frequency is less than 100 microseconds.

2. The method of claim 1, where $t_0$ is less than 10 microseconds.

3. The method of claim 2, where $t_0$ is less than 1 microsecond.

4. The method of claim 3, where $t_0$ is less than 500 nanoseconds.

5. The method of claim 1, where the base station switches from a first RF generator generating $f_1$ to a second generator generating $f_2$.

6. The method of claim 5, where $t_0$ is less than 10 microseconds.

7. The method of claim 6, where $t_0$ is less than 1 microsecond.

8. The method of claim 7, where $t_0$ is less than 500 nanoseconds.

9. The method of claim 1, where the base station switches from $f_1$ to $f_2$ using a fractional phase lock apparatus.

10. The method of claim 9, where $t_0$ is less than 10 microseconds.

11. The method of claim 10, where $t_0$ is less than 1 microsecond.

12. The method of claim 11, where $t_0$ is less than 500 nanoseconds.

13. The method of claim 1, where the base station switches from $f_1$ to $f_2$ using a phase lock apparatus which compares multiple bits from a reference frequency counter with multiple bits from a VCO frequency counter.

14. The method of claim 13, where $t_0$ is less than 10 microseconds.

15. The method of claim 14, where $t_0$ is less than 1 microsecond.

16. The method of claim 15, where $t_0$ is less than 500 nanoseconds.

17. An apparatus, comprising:
a base station for transporting energy to a radio frequency (RF) transponder (RF tag), the base station transporting for a first time RF electromagnetic wave energy, the RF energy having a first frequency $f_1$ during the first time, the base station transporting for a second time RF energy from the base station to the RF tag, the RF energy having a second frequency $f_2$ during the second time, wherein the time $t_0$ taken to change frequency from the first to the second frequency is less than 100 microseconds.

18. The apparatus of claim 17, where $t_0$ is less than 10 microseconds.

19. The apparatus of claim 18, where $t_0$ is less than 1 microsecond.

20. The apparatus of claim 19, where $t_0$ is less than 500 nanoseconds.

21. The apparatus of claim 17, where the base station switches from a first RF generator generating $f_1$ to a second generator generating $f_2$.

22. The apparatus of claim 21, where $t_0$ is less than 10 microseconds.

23. The apparatus of claim 22, where $t_0$ is less than 1 microsecond.

24. The apparatus of claim 23, where $t_0$ is less than 500 nanoseconds.

25. The apparatus of claim 17, where the base station switches from $f_1$ to $f_2$ using a fractional phase lock apparatus.

26. The apparatus of claim 25. where $t_0$ is less than 10 microseconds.

27. The apparatus of claim 26, where $t_0$ is less than 1 microsecond.

28. The apparatus of claim 27, where $t_0$ is less than 500 nanoseconds.

29. The apparatus of claim 17, where the base station switches from $f_1$ to $f_2$ using a phase lock apparatus which compares multiple bits from a reference frequency counter with multiple bits from a VCO frequency counter.

30. The apparatus of claim 29, where $t_0$ is less than 10 microseconds.

31. The apparatus of claim 30, where $t_0$ is less than 1 microsecond.

32. The apparatus of claim 31, where $t_0$ is less than 500 nanoseconds.

33. A system, comprising:
a base station for transporting energy to a radio frequency (RF) transponder (RF tag), the base station transporting for a first time RF electromagnetic wave energy, the RF energy having a first frequency $f_1$ during the first time, the base station transporting for a second time RF energy from the base station to the RF tag, the RF energy having a second frequency $f_2$ during the second time, wherein the time $t_0$ taken to change frequency from the first to the second frequency is less than 100 microseconds;
a computer controlling the base station; and
at least one RF tag for receiving energy from the base station.

34. The system of claim 33, where $t_0$ is less than 10 microseconds.

35. The system of claim 34, where $t_0$ is less than 1 microsecond.

36. The system of claim 35, where $t_0$ is less than 500 nanoseconds.

37. The system of claim 33, where the base station switches from a first RF generator generating $f_1$ to a second generator generating $f_2$.

38. The system of claim 37, where $t_0$ is less than 10 microseconds.

39. The system of claim 38, where $t_0$ is less than 1 microsecond.

40. The system of claim 39, where $t_0$ is less than 500 nanoseconds.

41. The system of claim 33, where the base station switches from $f_1$ to $f_2$ using a fractional phase lock system.

42. The system of claim 41, where $t_0$ is less than 10 microseconds.

43. The system of claim 42, where $t_0$ is less than 1 microsecond.

44. The system of claim 43, where $t_0$ is less than 500 nanoseconds.

45. The system of claim 33, where the base station switches from $f_1$ to $f_2$ using a phase lock system which compares multiple bits from a reference frequency counter with multiple bits from a VCO frequency counter.

46. The system of claim 45, where $t_0$ is less than 10 microseconds.

47. The system of claim 46, where $t_0$ is less than 1 microsecond.

48. The system of claim 47, where $t_0$ is less than 500 nanoseconds.

* * * * *